March 4, 1969     D. J. DOCKERY     3,430,494

PNEUMATIC CLAMP

Filed Oct. 9, 1967

INVENTOR

DENZEL J. DOCKERY

BY *Ross W. Campbell*

ATTORNEY

United States Patent Office 3,430,494
Patented Mar. 4, 1969

3,430,494
PNEUMATIC CLAMP
Denzel J. Dockery, G–4142 Fenton Road,
Flint, Mich. 48507
Filed Oct. 9, 1967, Ser. No. 673,662
U.S. Cl. 73—420                    7 Claims
Int. Cl. G01l *19/06*

ABSTRACT OF THE DISCLOSURE

A pneumatic clamp having a hollow body and an arm designed to embrace an outlet valve of a gas tank between the arm and body. A piston in a cylinder of the body has a bore through it to connect pressure from the outlet valve to the interior of the cylinder. Pressure within the cylinder forces the piston into a sealing contact with the outlet of the embraced valve. The cylinder communicates with a gauge to measure the pressure. A bleed valve in the side of the body releases the pressure in the cylinder when it is desired to detach the clamp from the outlet valve after this valve is closed.

BACKGROUND OF THE INVENTION

Field of the invention

The field of art to which the invention pertains is that of pneumatic clamping devices, and more particularly to a pneumatic clamp arranged to utilize the pressure of gas passing therethrough from a valve to cause the clamp to engage the valve.

Description of the prior art

Heretofore clamps for engaging pressure gauges to tanks of pressurized gas were required to be threadably engaged thereto. Considerable time and strength was required to engage and disengage the clamp to the tank. This was inconvenient and, in the emergency situations sometimes encountered by divers and others, was dangerous.

Summary

An object of the invention is to provide improved means for engaging a pneumatic clamp to the outlet valve of a tank of compressed gas. Another object is to provide a clamp arranged to utilize the pressure of gas released from a valve associated with a tank containing such gas under pressure to engage the clamp to the valve. These objects are accomplished by the cylinder and sliding piston arrangement of the present invention, working in cooperation with the arm which embraces the outlet valve of the tank.

Description of the preferred embodiment

Figure 1:
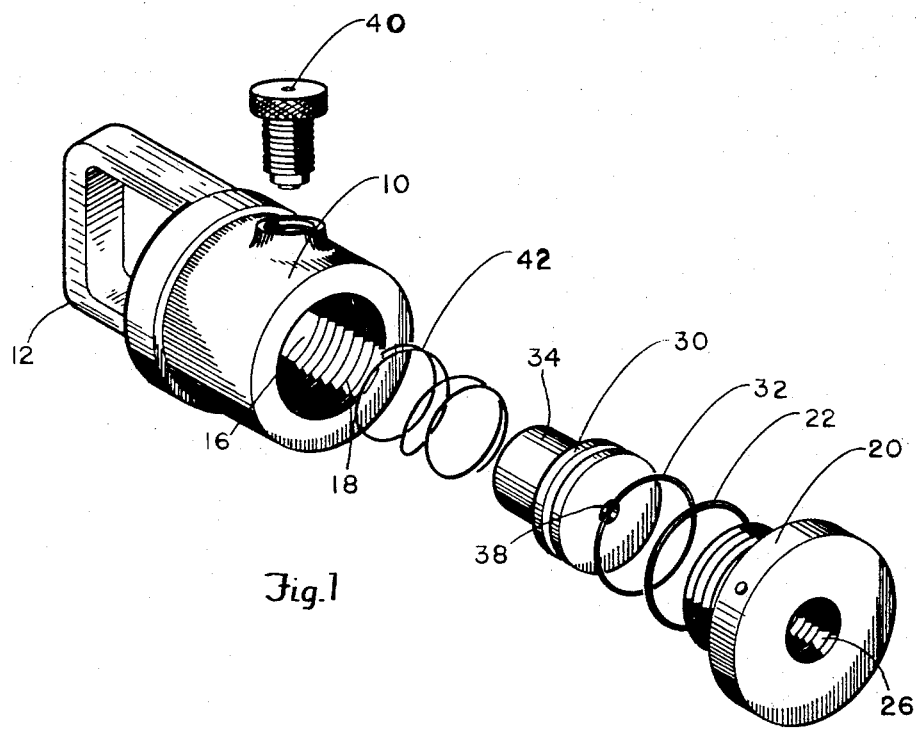
FIGURE 1 is an exploded view of my pneumatic clamp.
Figure 2:
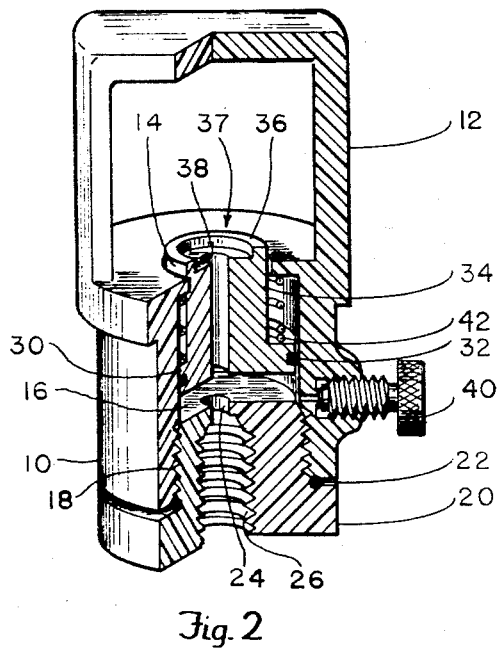
FIGURE 2 is a perspective view of my invention from the front and partly in section.

Referring now more particularly to the drawings, I provide a cylindrical body 10, formed of brass or other non-corrosive metal, and bearing an arm 12 bent to form a cross member and preferably forming a closed rectangular loop, at the forward end thereof. A longitudinal central bore 14 is drilled through body 10, and is counterbored to provide a cylinder 16. The rear end of the counterbore is threaded as at 18 to threadably receive a threaded plug 20 formed of material similar to that of body 10. An annular gasket 22 of neoprene or similar material is provided intermediate body 10 and plug 20.

A longitudinal bore 24 is formed in plug 20, and is counterbored and threaded to form an outlet 26 adapted for threadable engagement with a conventional pneumatic gas pressure gauge (not shown).

A piston 30 is provided, bearing an annular neoprene gasket 32, and is adapted to form a close sliding fit within cylinder 16. A neck 34 borne by piston 30 extends forwardly through bore 14, and is provided with an annular lip 36 on its forward end to form a mouth generally indicated at 37 adapted for close engagement with the outlet of a conventional outlet valve (not shown) for a tank of compressed gas. A central longitudinal bore 38 is drilled through piston 30 in alignment with bore 24, and in alignment with the port of the outlet valve of a tank of compressed gas when the clamp is operatively engaged therewith.

A bleeder valve, generally indicated at 40, is operatively mounted within body 10 and is arranged to permit the controlled release of gas from the interior of cylinder 16 to the external atmosphere. A coiled compression spring 42 is disposed within cylinder 30, surrounding neck 34, and arranged to yieldingly urge piston 30 rearwardly within the cylinder.

In operation, with the clamp assembled and bleeder valve 40 closed, a pneumatic pressure gauge is threadably engaged with threads 26. Arm 12 is then placed in surrounding relationship to the outlet valve of a tank of compressed air, and mouth 37 is manually pressed against the face of the outlet valve. The outlet valve of the tank of compressed gas is then opened. As gas flows out of the outlet valve of the tank of compressed gas, it passes through bore 38 into cylinder 16, filling the cylinder with gas under pressure, forcing piston 30 forwardly, compressing spring 42, and forcing mouth 37 into engagement with the outlet valve. The gas also passes from cylinder 16 through bore 24 into the pneumatic gauge, and causes the gauge to register the pressure of the gas.

When piston 30 is forced forwardly, it, in turn, forces the outlet valve firmly against arm 12. The pneumatic clamp is thus securely connected to the valve of the tank of compressed gas by the pressure of the compressed gas itself, without need for conventional means, such as threads, for such purpose.

When it is desired to release the clamp from the tank of compressed gas, the outlet valve of the tank is closed. Bleeder valve 40 is then opened to permit the gas within cylinder 16 to escape to the external atmosphere, reducing the pressure within the cylinder to atmospheric pressure. Spring 42 then moves piston 30 and neck 42 rearwardly within body 10, disengaging mouth 37 from the outlet valve of the tank of compressed gas. The clamp may then be removed from its surrounding relationship with the outlet valve of the tank of compressed gas.

While I have shown and described by invention as being utilized as a clamp to be engaged with the outlet valve of a tank of compressed gas, it is to be understood that it may also be utilized as a clamp for the outlet valve of a tank of compressed liquid or other fluid. Further, while I have described my pneumatic clamp as being used to transmit pressure to a gauge, it is to be understood that it may also be used to transmit compressed gas or fluid from one tank containing such at a higher pressure to another tank having a lower pressure.

It is to be further understood that the form of the invention herewith shown and described is to be taken as a preferred embodiment of the same.

What is claimed is:
1. A pneumatic clamp for an outlet valve of a container of compressed gas, comprising:
   a body having a hollow cylinder therein,
   an outlet in said body communicating with said cylinder, a piston slidingly arranged within said cylinder, extending through the forward end of said body, and adapted to contact said outlet valve, a bore extending through said piston and disposed to communicate said outlet valve with said cylinder when said piston is in contact with said valve, a bleeder valve in said body arranged to release gas from said cylinder to the external atmosphere, and an arm supported by said body and arranged to at least partially embrace said outlet valve when said piston is in contact with said outlet valve.

2. The device of claim 1 having an annular lip on said piston surrounding said bore through said piston and adapted to engage said piston with said outlet valve.

3. The device of claim 1 having a pneumatic gauge operatively engaged with said outlet in said body.

4. A device for connection to an outlet valve of a container of pressurized fluid, said device comprising:
(a) a body member having a hollow cylinder formed therein,
(b) a piston axially slidably mounted in said cylinder and being provided with an inlet adapted at one position of said piston to engage the outlet valve of said container of pressurized fluid and at another position to disengage from said outlet valve,
(c) outlet means connecting with said inlet and adapted for connection to means for receiving the fluid from said container, and
(d) means for selectively moving said piston intermediate said positions including means directing fluid from said inlet to an area on one side of said piston to move said piston into the outlet valve engaging position.

5. The device as defined in claim 4 and including means biasing said piston toward said outlet valve disengaging position.

6. The device as defined in claim 4 and including an arm member carried by said body and including a cross member spaced from the inlet end of said piston and operative upon movement of said piston toward said outlet valve engaging position to engage the opposite side of said outlet valve to clamp said device to said container.

7. The device as defined in claim 4 and including means for selectively relieving fluid pressure from said area on said one side of said piston.

References Cited
UNITED STATES PATENTS 2,208,292   7/1940   Hanson _____ 277—73

LOUIS R. PRINCE, *Primary Examiner.*

DENIS E. CORR, *Assistant Examiner.*